United States Patent [19]

Pohn

[11] Patent Number: 4,791,745
[45] Date of Patent: Dec. 20, 1988

[54] BLACK LIGHT DISPLAY SYSTEM
[76] Inventor: Mac R. Pohn, 803 Green Bay Rd., Highland Park, Ill. 60035
[21] Appl. No.: 28,678
[22] Filed: Mar. 20, 1987
[51] Int. Cl.⁴ .............................................. G09F 13/18
[52] U.S. Cl. ............................................ 40/546; 40/543
[58] Field of Search ................ 40/546, 543, 570, 549, 40/558, 575, 578, 620

[56] References Cited
U.S. PATENT DOCUMENTS

| | | | |
|---|---|---|---|
| 2,276,114 | 3/1942 | Sture | 40/546 |
| 2,499,824 | 3/1950 | Haecker | 40/546 |
| 2,564,110 | 8/1951 | Howenstine et al. | 40/546 |
| 2,630,643 | 3/1953 | Smithson et al. | 40/620 |
| 2,689,917 | 9/1954 | Switzer | 40/543 |
| 2,833,072 | 5/1958 | Gregory | 40/620 |
| 3,000,774 | 9/1961 | Swedlow et al. | 40/546 |
| 4,016,450 | 4/1977 | Balekjian | 40/543 |

Primary Examiner—Gene Mancene
Assistant Examiner—Cary E. Stone
Attorney, Agent, or Firm—Laff, Whitsel, Conte & Saret

[57] ABSTRACT

A lamp base houses a source of black light. An upstanding transparent acrylic sheet is edge lit by the black light source. Fluorescent paint on the surface of the acrylic sheet is excited by the black light, which causes the sign to light with an appearance somewhat similar to the appearance of a neon sign. The acrylic sheet is designed to snap into and out of the lamp base so that one sign may be substituted for another, quickly and easily.

9 Claims, 2 Drawing Sheets

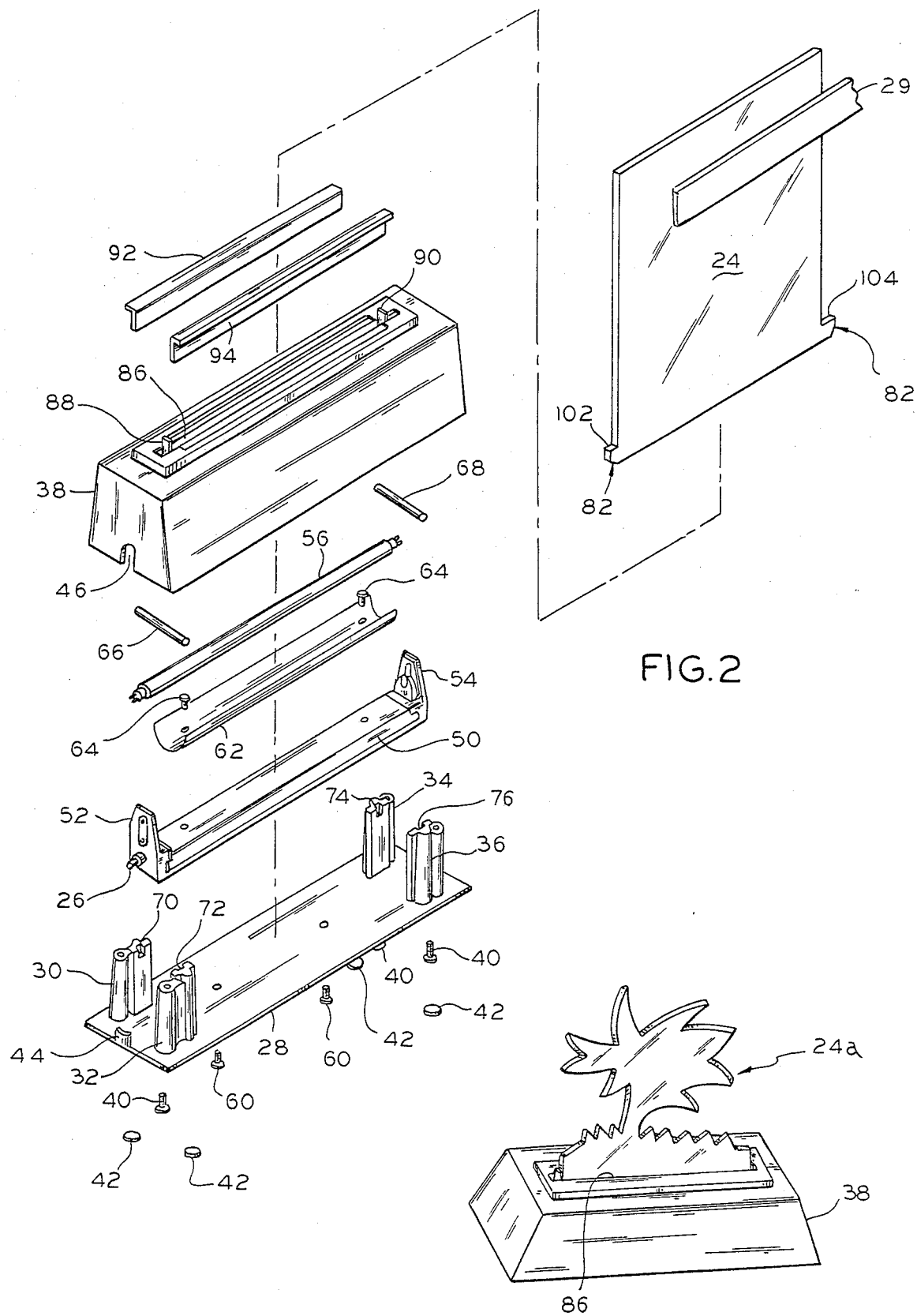

BLACK LIGHT DISPLAY SYSTEM

This invention relates to light boxes for providing attention getting displays, such as advertisements at a point of purchase or art forms in a place of entertainment, bar rooms, homes, and the like. Of course, these are only a few examples, the inventive device may be used anytime that an attention getting display is desired.

Signs providing the described type of attention are usually relatively expensive devices which are more or less dedicated to specific art forms, messages, and the like. For example, a neon sign involves bent glass tubing in the forms of letters, numbers, outlines, or the like. These forms are expensive to make and as a practical matter, can not change once they are made.

Other advertising signs in the described class of attention getting devices often include some feature such as whirling discs, animated members, and the like. These features add considerable expense and, therefore, are usually made as cheaply as possible. Thus, they often tend to malfunction and sometimes totally breakdown.

These factors lead to situations where it is very difficult to provide very low cost attention getting devices which are not also subject to very low levels of reliability.

Accordingly, an object of the invention is to provide new and improved displays of the described type. Here, an object is to provide a device which carries a message that may be changed quickly, easily, and at a very low cost.

In keeping with an aspect of the invention, these and other objects are accomplished by providing a lamp base housing any suitable source of light, especially black or ultraviolet light. An upstanding transparent acrylic sheet is edge lit by the light source. Fluorescent paint on the surface of the acrylic sheet is excited by black or ultra violet, preferably in the 200-360 nm range, light, which causes the sign to light with an appearance somewhat similar to the appearance of a neon sign. The acrylic sheet is designed to snap into and out of the lamp base so that one sign may be substituted for another, quickly and easily.

A preferred embodiment of the invention is shown in the attached drawings wherein:

FIG. 2 is an exploded view of the box of FIG. 1;

FIG. 7 shows the acrylic sheet in an irregular shape.

Figure 1:
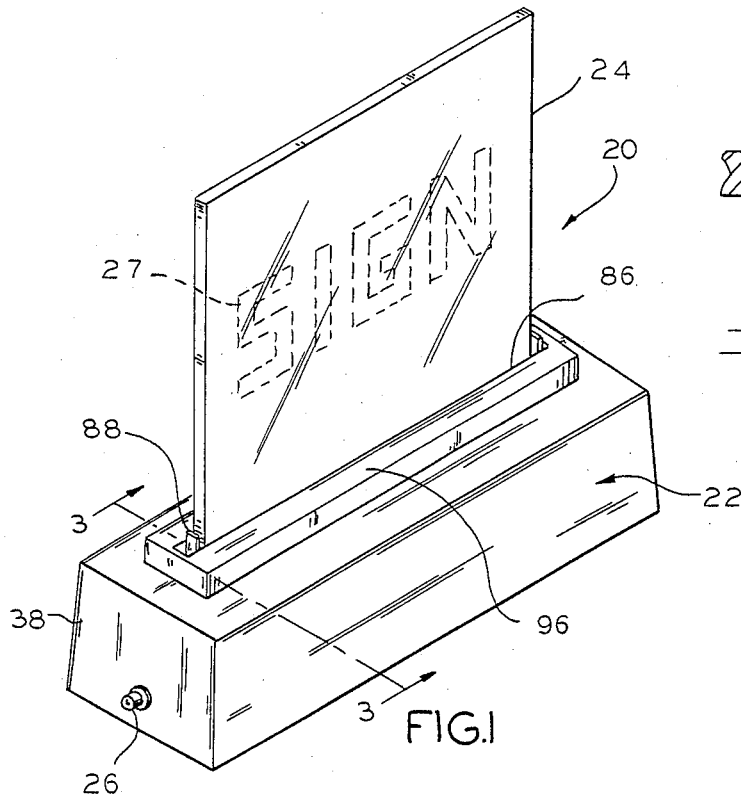
FIG. 1 is a perspective view of the inventive light box display.

FIG. 1 is a perspective view of the light box display 20 having a base 22, and a replaceable acrylic display sheet 24. A light switch 26 is equipped to turn a black light bulb off and on, in order to edge light the acrylic sheet 24 with black light which excites fluorescent paint 27. An example of a suitable black light lamp is an 8 watt bulb sold by Sylvania (F8T5/BLB); however, other suitable bulbs may also be used, such as the (F8T5 BL) lamp.

The internal construction of the inventive light box is seen in FIG. 2. A rectangular, preferably molded, plastic base has four upstanding posts 30, 32, 34, 36 formed on the corners thereof. These posts rise far enough to engage corresponding corners inside a molded housing 38, where screws, such as 40, may complete a connection. Rubber feet 42, or the like, may be attached to the bottom of base plate 28. The base plate 28 also has at least one upstanding boss, such as 44, which both closes an opening 40 for receiving the light switch 26 and stabilizes the position of the cover 38 relative to the base 28.

A lamp support member 50 has upstanding terminals 52, 54 for receiving and supporting electrodes at the ends of an elongated black light bulb 56. The ON/OFF switch 2 is positioned on the end of lamp support 50 to switch on or off the black light 56. Switch 26 fits into opening 46 of cover 38. The lamp support member 50 is attached to base 28 by screws 60. A reflector 62 is attached to base 50 by screws 64.

A pair of transverse rods 66, 68 fit into notches 70, 72, 74, 76 on the upstanding posts 30-36. These rods provide lower load bearing supports beneath the corners 80, 82 of acrylic sheet 24.

The housing cover 38 contains longitudinal slot 86 through which the acrylic sheet 24 projects. A pair of fasteners 88, 90 are located at opposite ends of slot 86 to lock the acrylic sheet 84 in place. A pair of light seals 92, 94 having L-shaped cross sections are fitted into the slot 86, on opposite sides of the acrylic sheet. The edges of the acrylic sheet are polish to remove all surface irregularities and to provide optical clarity. The polishing may be by buffing, flame polishing or the like.

Figure 4:
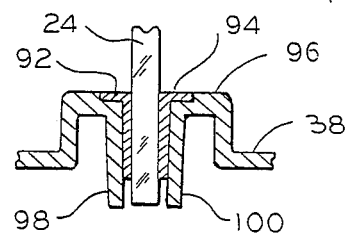
FIG. 4 is a fragmentary cross section showing a light seal adjacent an acrylic sheet which carries a message written in fluorescent paint.

As best see in FIG. 4, the cover 38 has an upstanding section 96 surrounding the slot. A downwardly extending wall section 98, 100 is located on opposite sides of the slot 86 to give vertical stability to the upstanding acrylic sheet 24. The L-shaped members 92, 94 fit into the spaces between the walls 98, 100 and acrylic sheet 24. It should be apparent from FIG. 4 that, when members 92, 94 are in place, the only light which can escape from inside the cover 38 is via the edge lighted sheet 24.

Figure 5:
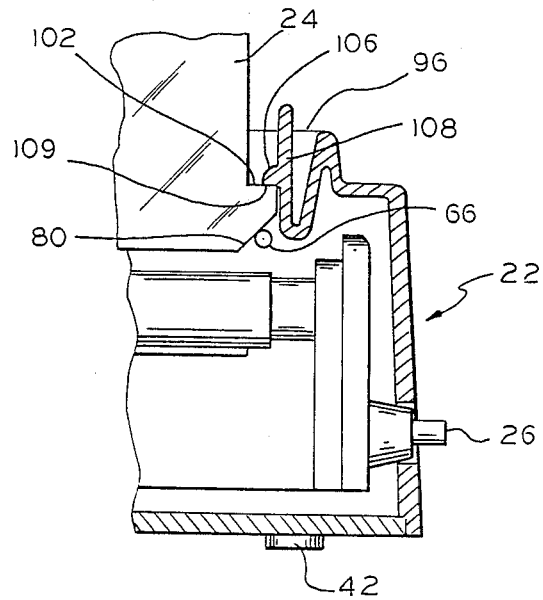
FIG. 5 is a cross sectional view of a corner of the light box with a spring clip for holding a display panel in place.
Figure 3:
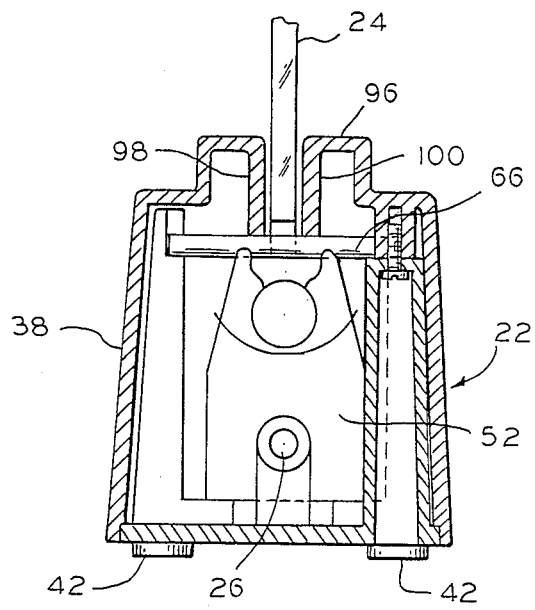
FIG. 3 is a cross section view taken along line 3—3 of FIG. 1.

As best seen in FIGS. 2, 5, each of the lower corners 80, 82 of the acrylic sheet is formed with a latch shape, having a lower or first cam surface 80, 82, leading to first catch surfaces 102, 104. The latches 88, 90 at the ends of slot 86 have a second cam surface 106 which deflects a cantilever spring 108 that is integrally molded in the housing 38. When the acrylic sheet 24 is pressed into the slot 86, the two cam surfaces 80, 106 bear against each other to deflect the cantilevered spring 108 far enough to pass the latch and to snap a second catch surface 109 over the first catch surface 102.

Hence, it should now be apparent that if the latches 88, 90 (FIG. 2) are pressed toward the outer ends of the cover 38, the acrylic sheet 24 may be lifted out of the slot 86. Another acrylic sheet may then be placed in the slot 86 and pressed down, with the latch springs snapping over surfaces 102, 104 to hold the acrylic sheet in place.

Each sign may have any suitable message 27 (FIG. 1) formed thereon by fluorescent paint, ink, or the like. Thus, for the price of an acrylic sheet, and the printing thereon, the display may be changed. In FIG. 2, an overlay of a PVC or similar material 29 (preferably static cling 8 mil. vinyl) has detail printed in fluorescent material. This material 29 may be placed over the acrylic sheet 24 to add more detail to the previous message. For example, a sheet 24a (FIG. 7) could be cut out in the irregular outline of a palm tree and the overlay could add leaves or a trunk, or the like. This overlay could be a teaser ad which adds a little information each week. Obviously, the outline of FIG. 7 could be any suitable design, such as a bowling pin, bird, number or other character.

The foregoing specification has described specific materials; nevertheless, it should be understood that other suitable materials may also be used. For example, sheet 24 has been described as being made of acrylic. While methyl-methacrylate is the most common of the acrylic plastics, many copolymers or alloys are formed with other non-acrylic monomers. Acrylic has a high optical clarity, a hard, gloss surface, good electrical properties, chemical resistance, and is available in brilliant, transparent colors. One suitable acrylic sheet is sold by Polycast Technology Corporation of Stamford, Conn. under the name UVT. It supposedly provides for 90% transmission of ultraviolet light in sheet thicknesses of 0.25 inches for wavelengths down to 300 nanometers.

The low index of refraction, 1.49 and the high degree of uniformity, makes this an excellent material for optical uses. Also, acrylic resists the adverse effects of ultraviolet or actinic light. More particularly, when a quanta of the incident light has energy which is equal to the bond energy of an atom or molecule, there is a high probability of the bond rupturing. Therefore, most materials with structures in this range must be protected from such light to inhibit the bond rupture. With acrylic, the actinic light from such a black light source, such as lamp 56, does not cause any such degeneration from bond rupturing. Other materials which have these characteristics may be used to make the sheet 44.

The paint 27 (FIG. 1) may be any suitable fluorescent material. The fluorescence process is defined in a general way as a luminescent radiation or emission which is produced when a material is in a transition between states of the same multiplicity, i.e., a singlet-singlet or a triplet-triplet transition. These transitions are very rapid. The multiplicity of the ground state will determine which of these transitions is favored. One suitable fluorescent material uses any suitable transparent vehicle, such as Ranger Clear Base (Rage-800) and, if necessary, T-934 thinner, all sold by Advance Process Supply Co. of Chicago, Ill. This base is mixed with fluorescent dyes or pigment, such as laser dyes made by Exciton Chemical Co., Inc. P.O. Box 31126 Overlook Station, Dayton, Ohio 45431.

Energy must be imparted to a fluorescent material before luminescence can take place. Excitation energy may be supplied in various forms, such as by light (photoluminescence). Any materials having a fluorescent characteristic may be applied to the transparent sheet 24 by any of a number of different techniques. For example, a silk screening process involves using a squeegee to force ink or paint through the interstices of a stencilled screen. To create the stencil, a positive of the art copy is light-exposed onto a photo-sensitive stencil film secured to the screen. Multicolor screening requires a screen for each color, with adequate drying time for each color before the next color is applied.

Hot stamping is another method used for decorating plastic materials. A thermoplastic color coat is applied to a plastic carrier film. When a heated die is pressed against the carrier, the color coat is released to adhere to a surface on a product placed beneath it. Die temperature, die pressure and dwell time are important and must be controlled.

Heat transfer printing is a one-pass method for securing a single or multi-color decoration on a film or a paper carrier to the surface of a product. A fusible release coat and a thermoplastic ink image are used. The ink becomes tacky when heated by a hot platen. It is then pressed against the receiving surface where the ink bonds to the surface. Sometimes the fusible release coat is adapted to carry over with the ink, thus providing the image with a protective coating. In practice, the process may be accomplished by preheating the carrier paper and effecting the ink transfer by means of a heated rubber roll which insures a full line contact with the receiving surface.

Figure 6:
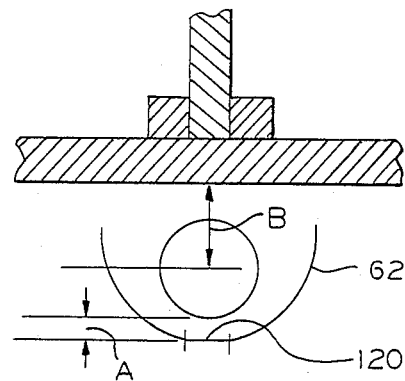
FIG. 6 shows an optimal cross section for a reflector with no associated lens.

FIG. 6 shows a preferred cross section of the reflector 62, which is preferably 10 mil polished aluminum. At the bottom section 120, the reflector is flat for 0.25 cm for a lamp 56 having a radius of 0.75 cm. Outside of the area 120, the reflector is curved with a radius of 1.5 cm for the 0.75 cm radius lamp. The reflector is held 0.125 cm below the perimeter of the lamp 56 (Distance A). The center of the lamp is 1.25 cm below the adjacent edge of the acrylic sheet 24 (Distance B). This is thought to be the best dimensions for a lighting system having no lenses.

With the described construction, light entering at one edge of the sheet of acrylic 24 is efficiently transmitted to the other edges, and is reflected from the inside surface of the material. The edges may be painted with fluorscent paint to glow, or sealed to prevent light leakage, while the rest of the sheet remains almost invisible. Except where the light is introduced into the acrylic, the edge seal should be light reflecting (e.g., a silver coating) material. This form of lighting is called "edge-lighting". The light is an integral part of the material itself, and is not an element imposed on it. As the fluorescent material glows, it takes on a characteristic which is similar to that of a lit neon sign.

Those who are skilled in the art will readily perceive how to modify the invention. Therefore, the appended claims are to be construed to cover all equivalent structures which fall within the true scope and spirit of the invention.

The invention which is claimed is:

1. An attention getting device comprising a lamp base housing a source of ultraviolet light, an opening formed in said housing over said source of said ultraviolet light whereby light from said source escapes from said housing via said opening, fastener means associated with said opening, transparent flat sheet material having dimensions for fitting through said opening and over said light source in a position which edge lights said sheet material, fluorescent material on said sheet material for glowing in response to said edge lighting of said sheet material, and latch means formed on said sheet material for engaging said fastener means when said sheet material is pressed through said opening and into engagement with said fastener means, said latch means including a portion of said sheet material which is cut into a shape of a first cam surface leading to a first catch surface, and said fastener means including a cantilever arm having a second cam surface and a second catch surface, said first and second cam surfaces coming together to deflect said cantilever arm, said first and second catch surfaces engaging each other after said cam surfaces pass each other.

2. The device of claim 1 and light seal means on opposite sides of said sheet at locations where said sheet passes through said opening, whereby the only light which can leave said housing must leave via said sheet.

3. The device of claim 1 wherein said sheet material is made of acrylic.

4. The device of claim 1 wherein said sheet material is in the shape and outline of a design.

5. The device of claim 1 and an overlay with fluorescent material which may be adhered to said material in order to add detail to said material.

6. The device of claim 1 and an overlay with fluorescent material adhered to said sheet material to provide a changeable design.

7. An attention getting device comprising a lamp base housing a source of ultraviolet light, a slot formed in said housing over said source of said ultraviolet light whereby light from said source escapes from said housing via said slot, resilient fastener means located at least at one end of said slot, transparent material having dimensions for fitting through said slot and over said light source in a position which edge lights said material, and latch means formed on said transparent material for deflecting and engaging said fastener means when said transparent material is pressed through said slot and into engagement with said fastener means.

8. The device of claim 7 wherein said resilient fastener means is integrally molded into said lamp base housing.

9. The device of claim 7 and a reflector below said light source.

* * * * *